No. 700,145. Patented May 13, 1902.
J. B. LARNED, J. L. PARKER & J. A. JOYCE.
CONICAL ROLLER BEARING.
(Application filed Jan. 26, 1901.)

(No Model.)

Witnesses:
R. A. Boswell.
A. M. Wilson.

Inventors.
J. B. Larned,
J. L. Parker,
Jas. A. Joyce;
By Jas. A. Joyce, Attorney

UNITED STATES PATENT OFFICE.

JOSHUA B. LARNED, JAMES L. PARKER, AND JAMES A. JOYCE, OF CLEVELAND, OHIO.

CONICAL-ROLLER BEARING.

SPECIFICATION forming part of Letters Patent No. 700,145, dated May 13, 1902.

Application filed January 26, 1901. Serial No. 44,939. (No model.)

*To all whom it may concern:*

Be it known that we, JOSHUA B. LARNED, JAMES L. PARKER, and JAMES A. JOYCE, residing at Cleveland, in the county of Cuyahoga and State of Ohio, have invented a new and Improved Conical-Roller Bearing, of which the following is a clear, full, and exact description.

The object of the invention is to provide a bearing for heavy loads which will distribute the load evenly over its supports and so arranged that it may be turned with as little power as possible, making it an easy and convenient bearing to turn heavy loads upon, such as engines, boilers, heavy bridge members, &c.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both views.

Figure 1:
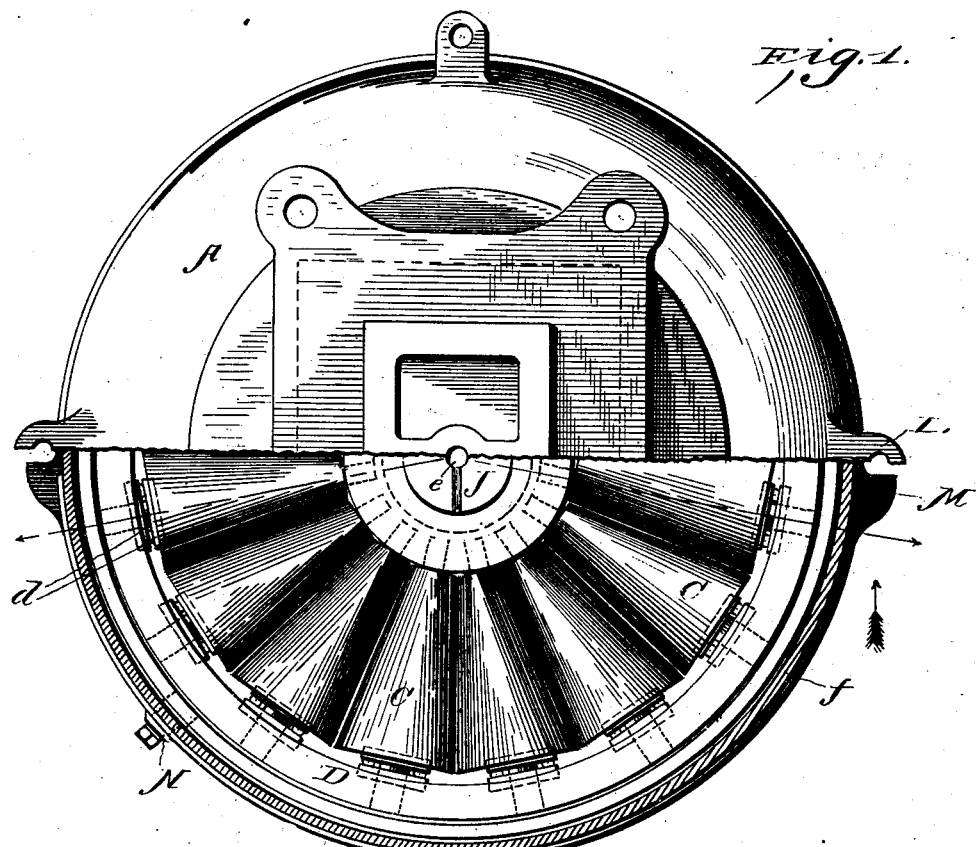
Figure 2:
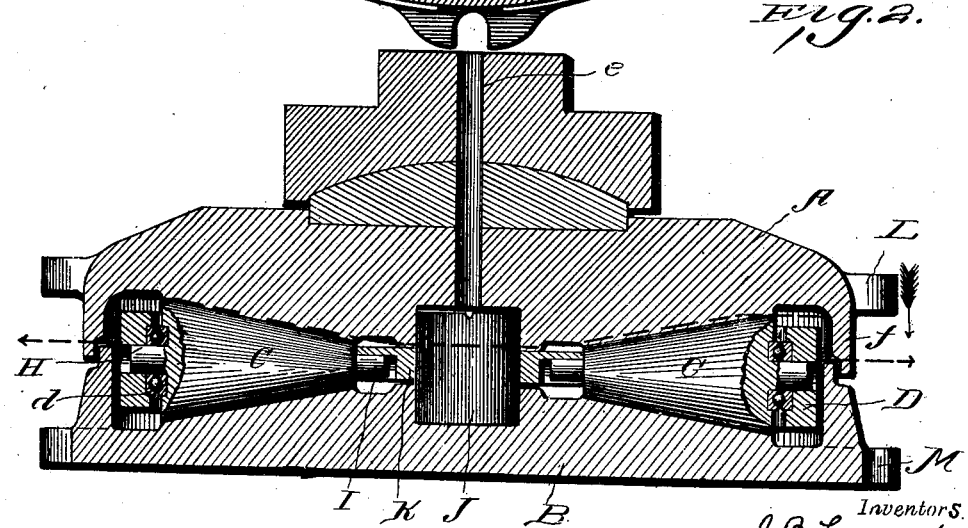

Figure 1 shows a top view of the center with one-half of the upper section removed to show an inside view. Fig. 2 shows a central vertical sectional view.

The conical-roller bearing illustrated in the drawings is provided with an upper section A and a lower section B, each of which has a wearing-surface arranged to bear evenly on a nest of conical rollers C, interposed between the said upper section A and the lower section B.

The rollers C are arranged to rest and to roll on the wearing-surface of the lower section B. The upper section A is arranged to rest on the top of the nest of rollers, and when the bearing is turned around the rollers rests and rolls on the bearing-surfaces of the upper and lower sections, thereby causing a purely roller-bearing.

The rollers are conical in shape, so that they will roll on the circular-roller bearing-surface of the upper and lower sections of the bearing. The rollers are provided with a journal or trunnion at their inner and outer ends. The journal H at the outer end of the rollers is arranged to support a rotative ring D. This ring is to take the thrust due to the roller being conical. Each roller is provided with a bearing on the ring. The friction due to the roller bearing on the ring may be reduced in several different ways, such as disks or annular rings $d$ to take the bearing; but we prefer to use in this case balls arranged to roll in annular grooves or ball-races. An annular ball-groove or ball-race is provided in each of the rings $d$, these rings being arranged in the rotative ring D and in the larger end of each roller. Balls are interposed between the two confronting annular grooves or ball-races. These balls provide an antifriction-bearing for the end of each roller. When the upper section A is revolved in a horizontal plane, the rollers revolve about their axes and carry the ring with them. The thrust produced by the rollers being taken by the ring offers little or no resistance to turning the upper section A with a very heavy load upon it. These annular ball races or grooves may be cut in the ring and rollers, or they may be made in separate pieces and fitted into the ring and into the ends of the rollers, as shown.

The upper section A is provided with a space on top, which may be changed to suit whatever the bearing is to be used for, such as the end of a shaft. A pair of girders for an engine turn-table or a street-car turn-table or, in fact, anything may be fitted to this bearing that is to be revolved in a horizontal plane. The upper section A is also provided with a vertical flange $f$, which is arranged to cover the ring and to fit to the lower section B, so as to practically exclude all dust and dirt and to allow the rollers, balls, and ring the freedom of movement and to keep out all dust and dirt.

The upper section A is provided with a recess, into which a pin J is inserted. The upper section A is pivotally fixed to pin J. This pin J holds the upper section A in a firm position, so that the upper section A cannot be knocked out of position.

The lower section B is provided with means of securing it to its foundation. The said lower section B is made flat on the bottom, so that the load upon the center is distributed evenly over its supports.

The inner end of each roller is provided with a journal I, which pivotally fits in center ring K. This center ring is to keep the inner ends of the rollers in their proper position. This ring K is pivotally fitted to center pin J, which further holds the rollers in position.

The upper section A is provided with lugs L, which are used only to ship and to handle the completed center. They coincide with lugs M, which are used to secure the lower section B to the foundation; but for the purpose of keeping the center in its proper relative position a bolt is put through the holes in lugs L and M, and by this means the upper and lower sections are secured together with all the interior parts in their proper positions, which affords an easy and convenient method of shipping the completed center. After the center reaches its destination the bolts are removed and the lower section B is secured to the foundation and the upper section is free to revolve or turn in a horizontal plane. The center is intended to run in oil and is provided with a plug and outlet N, which serves to drain the oil off when it becomes necessary to put fresh oil in the center. A hole e is provided at a convenient place in the upper section for putting in fresh oil.

Having thus fully described our invention, we claim as new and desire to secure by Letters Patent—

1. In a roller-bearing, the combination of a lower section having an inclined wearing-surface and an annular upwardly-extending flange, an upper section having a wearing-surface inclined in the reverse direction to the wearing-surface of the lower section, said upper section having a downwardly-extending annular flange which incloses the upper portion of the flange of the lower section, a series of conical bearing-rollers arranged on the wearing-surface of the lower section and engaged by the wearing-surface of the upper section, a pin loosely mounted in central recesses provided therefor in the lower face of the upper section and upper face of the lower section respectively, a center ring carried by said pin and circumferentially recessed on its underneath face to receive trunnions on the inner ends of the conical rollers, a rotative ring having apertures to receive trunnions on the outer ends of the conical rollers, and antifriction-bearings between the ends of the rollers and the rotative ring, substantially as described.

2. In a roller-bearing, the combination of a lower section having a wearing-surface and an upwardly-extending annular flange, an upper section having a wearing-surface and a downwardly-extending annular flange that surrounds the upper portion of the flange of the lower section, said upper section having a central oil-aperture, a series of circumferentially-arranged conical bearing-rollers engaged by the wearing-surfaces of the sections, a pin fitted in central recesses provided therefor in the lower face of the upper section and upper face of the lower section, a center ring mounted on said pin to receive trunnions on the inner ends of said rollers, grooved bearing-rings in said rotative ring and in the outer ends of the rollers, and antifriction-bearings in said grooved bearing-rings, substantially as described.

JOSHUA B. LARNED.
JAMES L. PARKER.
JAMES A. JOYCE.

Witnesses:
C. W. STUTE,
W. L. KNOX.